(12) United States Patent
Weinbrenner

(10) Patent No.: US 6,466,887 B1
(45) Date of Patent: Oct. 15, 2002

(54) GRAVIMETRIC ROTATION SENSORS: DEAD RECKONING, VELOCITY, AND HEADING SENSOR SYSTEM FOR VEHICLE NAVIGATION SYSTEMS

(76) Inventor: Richard L. Weinbrenner, 15848 W. 132nd St., Lemont, IL (US) 60439

( * ) Notice: Subject to any disclaimer, the term of this patent is extended or adjusted under 35 U.S.C. 154(b) by 0 days.

(21) Appl. No.: 09/518,305

(22) Filed: Mar. 3, 2000

Related U.S. Application Data

(60) Provisional application No. 60/122,723, filed on Mar. 3, 1999.

(51) Int. Cl.$^7$ ............................. G06F 15/00; G01P 3/00
(52) U.S. Cl. ............................. 702/141; 73/146; 701/1; 702/147; 702/148
(58) Field of Search ............................. 701/213, 214, 701/229, 1; 702/141, 142, 145, 147, 148; 340/442, 988; 73/146, 146.2, 146.4, 146.5

(56) References Cited

U.S. PATENT DOCUMENTS

| | | | |
|---|---|---|---|
| 4,032,758 A | 6/1977 | Lewis | |
| 4,135,155 A | 1/1979 | Kehl | |
| 4,444,053 A * | 4/1984 | Rider | 73/504 |
| 4,462,254 A * | 7/1984 | Rider | 73/510 |
| 4,520,669 A * | 6/1985 | Rider | 73/510 |
| 4,566,327 A * | 1/1986 | Rider | 73/510 |
| 4,876,527 A | 10/1989 | Oka | |
| 4,903,212 A | 2/1990 | Yokouchi | |
| 5,103,413 A | 4/1992 | Ohata | |
| 5,301,130 A | 4/1994 | Alcone | |
| 5,334,986 A | 8/1994 | Fernhout | |
| 5,339,684 A * | 8/1994 | Jircitano et al. | 73/178 R |
| 5,525,998 A | 6/1996 | Geier | |
| 5,526,263 A | 6/1996 | Tanaka | |
| 5,557,552 A | 9/1996 | Naito | |
| 5,579,230 A | 11/1996 | Lin | |
| 5,862,511 A | 1/1999 | Croyle | |
| 6,185,502 B1 * | 2/2001 | Sumner et al. | 701/208 |
| 6,237,403 B1 * | 5/2001 | Oldenettel et al. | 73/146.5 |
| 6,259,361 B1 * | 7/2001 | Robillard et al. | 340/447 |
| 6,282,496 B1 * | 8/2001 | Chowdhary | 701/220 |
| 6,308,134 B1 * | 10/2001 | Croyle et al. | 701/220 |

FOREIGN PATENT DOCUMENTS

| WO | WO 99/01302 | * 1/1999 | 73/146.5 |
|---|---|---|---|

* cited by examiner

Primary Examiner—Patrick Assouad
(74) Attorney, Agent, or Firm—Jeffrey P. Calfa

(57) ABSTRACT

A rotational sensor for use with an in-vehicle navigation system, a navigation system that uses the sensor, and a vehicle with the sensor installed. The rotational sensor is created by placing two gravitational accelerometers configured at 90 degrees with respect to one another and mounted at the center of a vehicle wheel. As this resulting sensor is rotated, sine and cosine signals with a quadrature relationship are generated with respect to the earth's gravity vector, from which both rotation and direction of rotation can be determined. These signals may then allow the counting of the turns of the wheel, thus estimating the distance and the rate at which the vehicle has moved. A self-contained version of this device including a transmitter can relay this information to a receiving unit located within the vehicle. When one of these devices is located on each of the steerable wheels of the vehicle, the relative heading-direction of the vehicle may also be estimated.

21 Claims, 6 Drawing Sheets

GRAVIMETRIC ROTATION SENSORS: DEAD RECKONING, VELOCITY, AND HEADING SENSOR SYSTEM FOR VEHICLE NAVIGATION SYSTEMS

This is a non-provisional application claiming priority under provisional patent application Ser. No. 60/122,723, filed Mar. 3, 1999.

BACKGROUND OF THE INVENTION

This invention relates to a rotational sensor for use with an in-vehicle navigation system, a navigation system that uses the sensor, and a vehicle with the sensor installed. The rotational sensor is created by placing two gravitational accelerometers configured at 90 degrees with respect to one another or otherwise out of synch and mounted at or near the center of a vehicle wheel or mounted at a given radius from the center of the wheel. As this resulting sensor is rotated, sine and cosine signals with a quadrature relationship are generated with respect to the earth's gravity acceleration force vector, from which both rotation displacement and direction of rotation displacement can be determined. These signals may then allow the counting of the turns of the wheel, thus estimating the distance and the rate at which the vehicle has moved. A self-contained version of this device including a transmitter can relay this information to a receiving unit located within the vehicle. When one of these devices is located on each of the steerable wheels of the vehicle, the relative heading-direction of the vehicle may also be estimated.

PRIOR ART

Vehicle navigation systems require dead-reckoning information between GPS fixes. This becomes very important in urban environments and where the environment obstructs a line-of-sight view of the GPS satellite system, such as tree foliage which arches over the roadway, and in covered structures such as tunnels, garages and bridges. It is also important because of the error built into the prior art GPS signal for non-military uses. Often the vehicle has an existing speed pulse signal generated from the drive train or a wheel, intended primarily for the speedometer/odometer, the cruise control, or the anti-lock braking system. This signal will typically give one pulse per revolution, which at low speeds offers very poor resolution and poor update rates. It also offers no forward-reverse direction information. Forward-reverse direction information is generally provided by a switch closure indicating the vehicle is in reverse gear. No prior art used accelerometers engaged to a wheel to use measurement of gravity at various positions of the accelerometers during various stages of wheel rotation to provide indication and direction of wheel rotation of a vehicle.

In the case of 'after market' equipment for the vehicle market, it is required to find the wire containing the signal and properly attach to it without disturbing the signal's ability to do its original job. If an automotive mechanic or installer does the job, there is added cost.

In addition, the 'after market' implementation of speed pulse is typically implemented via the signal that provides cruise control. In some cases this signal is unreliable at speeds under 20 mph, and on some vehicles is completely absent at speeds under 5 mph.

To date, neither a rotational sensor nor a vehicle navigation system in combination with a rotational sensor has been suggested which can provide a vehicle with accurate running fix information without a hard wired connection to the sensor using accelerometers while providing direction of wheel rotation as well as speed of rotation information.

SUMMARY OF INVENTION

As a result, a primary object of this invention is to provide a rotational sensor that provides an in-vehicle GPS navigation system with wheel rotation information from accelerometers engaged to a wheel to measure gravity at various positions of the accelerometers during various stages of wheel rotation to provide indication of wheel rotation. A second object of the invention is to provide a rotational sensor that provides direction of wheel rotation information to a vehicle navigation system. A third object of the invention is to provide a rotational wheel sensor that does not require a hard-wired communication path to a vehicle navigation system.

The rotational wheel sensor and a vehicle navigation system in combination with the rotational wheel sensor of this invention satisfy all of the above objects plus others not mentioned. The rotational sensor at a minimum will have two gravity-sensing accelerometers aligned ninety degrees relative to each other. The rotational sensor can be attached to a wheel of a vehicle, or preferably to each of the front steerable wheels, and provide speed-or distance-measured data. In one embodiment, this device can have its own power supply and use a radio frequency transmitter to communicate its digital data to a remote receiver unit to collect the data for the navigation unit requiring the dead-reckoning data.

When this device is used on each front wheel, a first sensor will mount on the left front wheel and a second sensor will mount on the right front wheel. In this case, the devices will provide the speed and distance information, but additionally will provide relative heading information. When the vehicle makes a left turn, the right wheel must travel a greater distance than the left wheel; this information may be converted into relative heading information by a computerized device.

Additionally, the ordinary prior art speed pulse system offers very low resolution. This invention offers very high resolution, down to a small fraction of a revolution of each wheel. This invention provides low speed and vehicle forward-reverse direction information and accurate vehicle heading information. Use of two gravity sensing accelerometers per wheel and the quadrature (90 degree shifted waveform) will allow the sensor of this invention to provide information as to the direction the wheel is rotating, i.e., giving information about the direction the vehicle is traveling (forward or reverse).

Each vehicle model will have its own specific wheel diameter. This diameter could be entered into the system. Or the navigation system can 'learn' the diameter by comparing the data received from the wheel sensors with other navigation information it will have as input data, such as GPS fix information or map and maneuver correlation. Over a short period of time, the system can discover or 'learn' the effective wheel diameters and can use the data this invention supplies to achieve very high accuracy.

It is necessary to insure that each wheel sensor is able to send its data and have it properly identified and not interfered with by simultaneous transmissions. Techniques such as assigning a unique manufacturer and serial number device address identifier of sufficient length so that the chance of misidentification of data from other vehicles or from the other transmitter on this vehicle is very unlikely. Also, due to the possibility of disruptions in the RF environment, error correction and data verification can be used. Further techniques include using a transmitter at each sensor having its own channel, spread spectrum radio techniques, or time-randomized transmission bursts in order to permit a system to operate with multiple wheel sensor devices and even when other nearby vehicles are equipped with the same type devices.

Furthermore, special care in choosing the formatting and inclusion of certain data can reduce the significance of missed data. Each sensor module maintains a clock and also a wheel position, which contains the positions up to some number of revolutions of the wheel, with a resolution of a small fraction of a wheel rotation. In this case, even if a data transmission is corrupted or otherwise missed, the receiver will, at the next transmission, have the true position of the wheel and the time stamp of that position.

Also the timestamp at the time of transmission of the data is sent so that the receiver can monitor the sensor clock to further increase the precision. This also allows the navigation system to coordinate the signals from this invention with other sensor information such as GPS.

DRAWINGS

Other objects and advantages of the invention will become more apparent upon perusal of the detailed description thereof. In upon inspection of the drawings, in which.

DETAILS OF INVENTION

Figure 1:
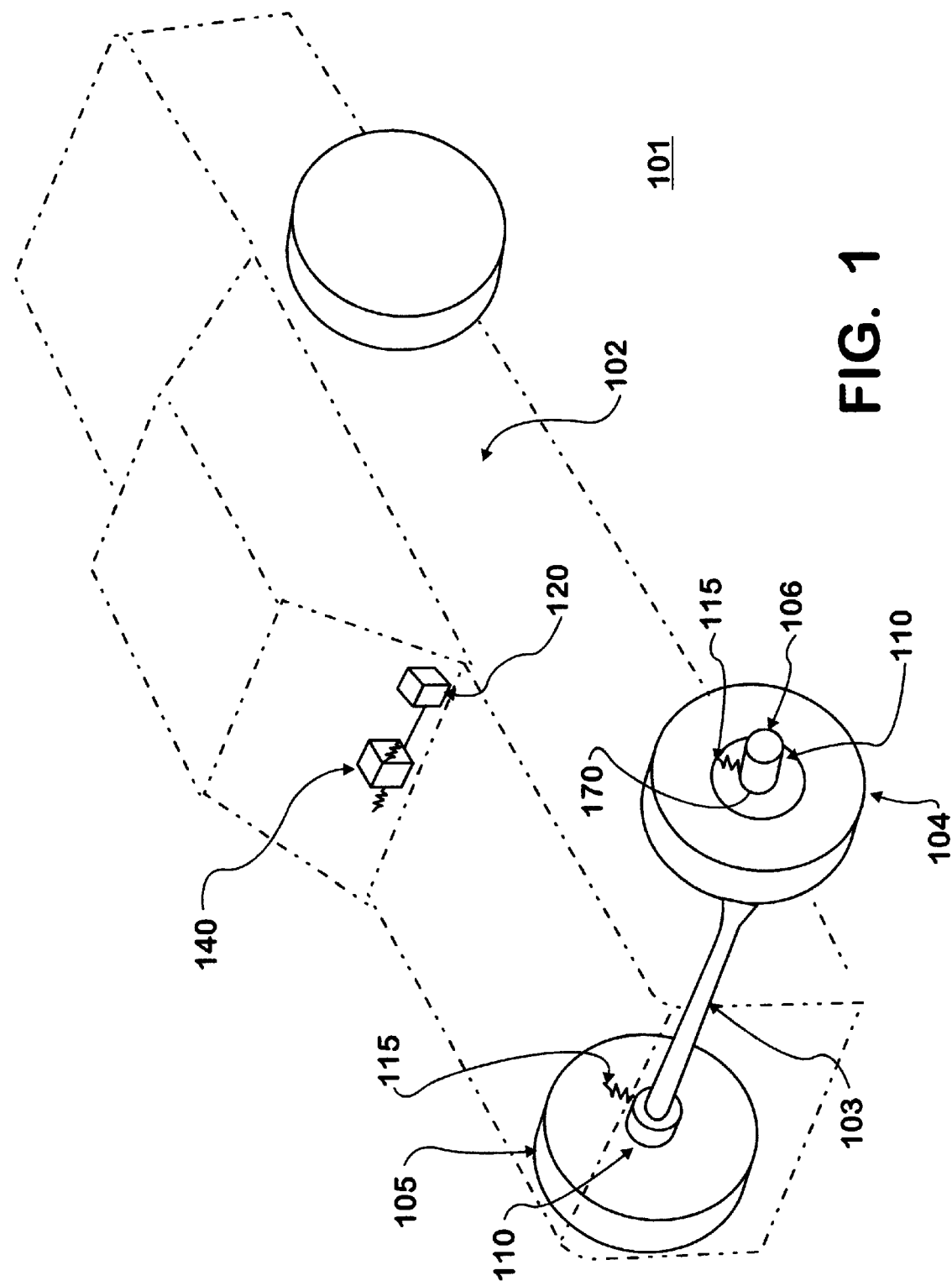
FIG. 1 is a vehicle with a rotational wheel sensor and navigation system made inaccordance with this invention.

A mobile vehicle 101 is shown in FIG. 1. The vehicle 101 has an installed gravimetric rotational wheel sensor 110, and a receiver 140 for communication with an onboard Global Positioning System (GPS) navigation system 120 made in accordance with this invention. The vehicle 101 has a body 102 engaged to at least a front axle 103. The front axle 103 engaged to a left front steerable wheel 104 and a right front steerable wheel 105. Each of these wheels has an inner hub 106 for mounting to the front axle 103. FIGS. 1A to 7 show the rotational wheel sensor 110 and portions of the navigation system 120.

Figure 1A:
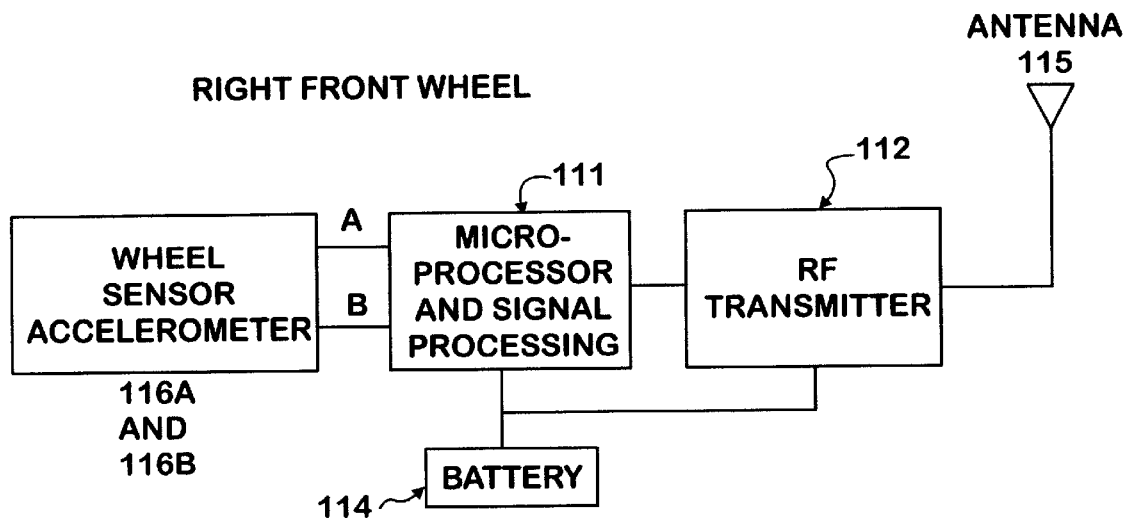
FIG. 1A is a block diagram of a system mounted onto a right front steerable wheel of the vehicle of FIG. 1.
Figure 1B:
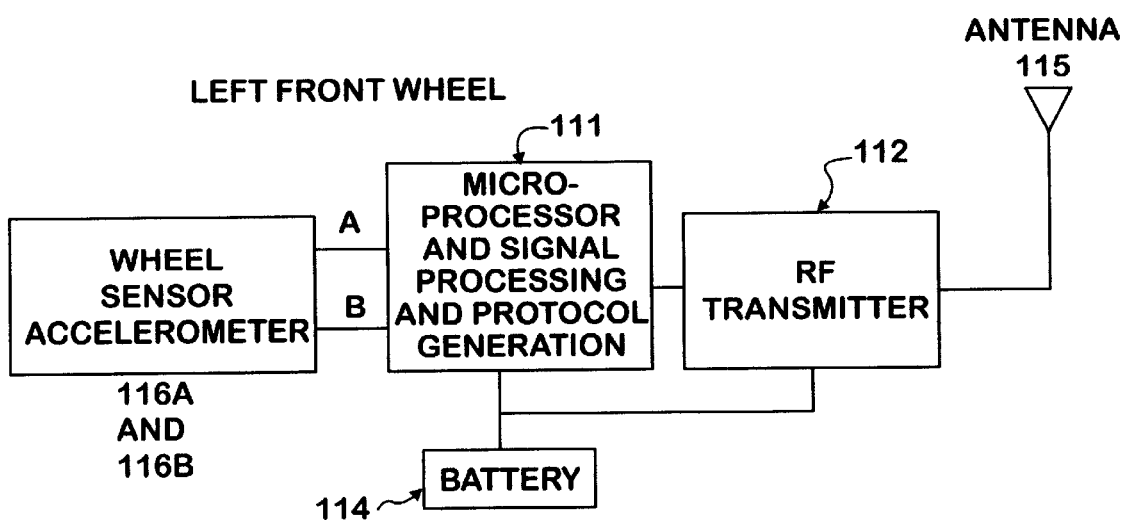
FIG. 1B is a block diagram of a system mounted onto a left front steerable wheel of the vehicle of FIG. 1.
Figure 2:
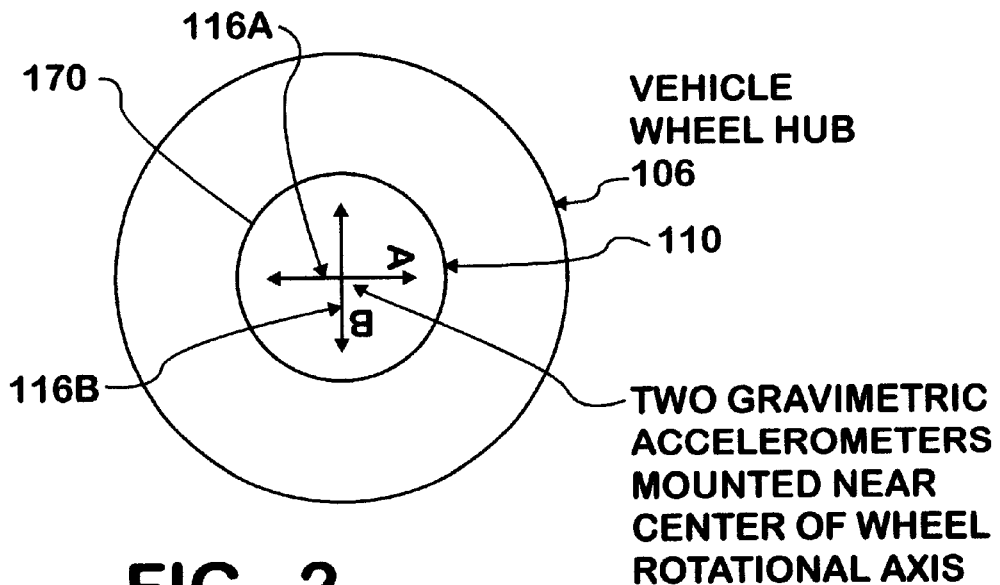
FIG. 2 depicts the gravimetric rotation sensors of FIGS. 1A and 1B.

FIGS. 1A and 1B each depict block diagrams of a portion of the navigation system 120 which contains at least one rotational gravimetric wheel sensor 110 mounted onto the right and left front wheels, respectively. The wheel sensors 110 may be mounted to the inner hub 106 of the wheels. Each of the wheel sensor's 110 outputs are received by a microprocessor-based electronic circuit 111, which may accomplish various signal processing and data correlation functions. The resultant stream of data may be transmitted by an RF transmitter 112 to the receiver 140 located within the vehicle 101. Although an RF transmitter 112 is referred to here, any transmission means that allows remote reporting of wheel position from accelerometers without the need for hard wiring between the wheel sensor and the navigation system may meet the intent of the invention. The electronic circuit 111 may have its own battery 114 for power. In the alternative, the electronic circuit may have a generator that converts sensed rotational motion of the wheels to electric power. The RF transmitter 112 may be engaged to an antenna 115. FIG. 2 depicts a preferred embodiment gravimetric rotation sensor 110 comprised of the two gravitational accelerometers, a first accelerometer 116A and a second accelerometer 116B for providing signals to the transmitter 112. The rotation sensor 110 may have a container 170 for wheel mounted components. The container 170 is configured with mounting means so that when mounted on the wheel or wheel hub 106, the accelerometers 116A and 116B may be located near the center of the wheel. As will be discussed below, the proximity to the center of the wheel is important to avoid saturation of the accelerometers due to sensed wheel rotation centripetal forces. The mounting means may include wheel lug nuts or means for engagement to the tire air valve or means for engagement to an axle oil end cap. The means for engagement to the tire air valve may include a threaded female connection for engagement to the male tire valve end. The accelerometers 116A and 116B aligned relatively to sense gravitational force 90 degrees out of synch from each other, as shown. When the gravimetric wheel sensor 110 is installed with the accelerometers 116A and 116B near the center of the wheels 104 and 105. The gravimetric rotation sensor 110 outputs two signals representing the magnitude and direction of the gravity vector component in line with the axis of each gravitational accelerometer 116A and 116B. A gravimetric rotation sensor may be made with one accelerometer 116A to obtain wheel speed. The electronics for this device would be similar to the preferred embodiment except there would only be one output signal. Additionally, the two accelerators 116A and 116B of the wheel sensor 110 may also engaged at a different out of synch angle than 90 degrees so long as a difference between the signal outputs of each of the accelerometers may be detected. This difference allows detection of direction of rotation.

Figure 3:
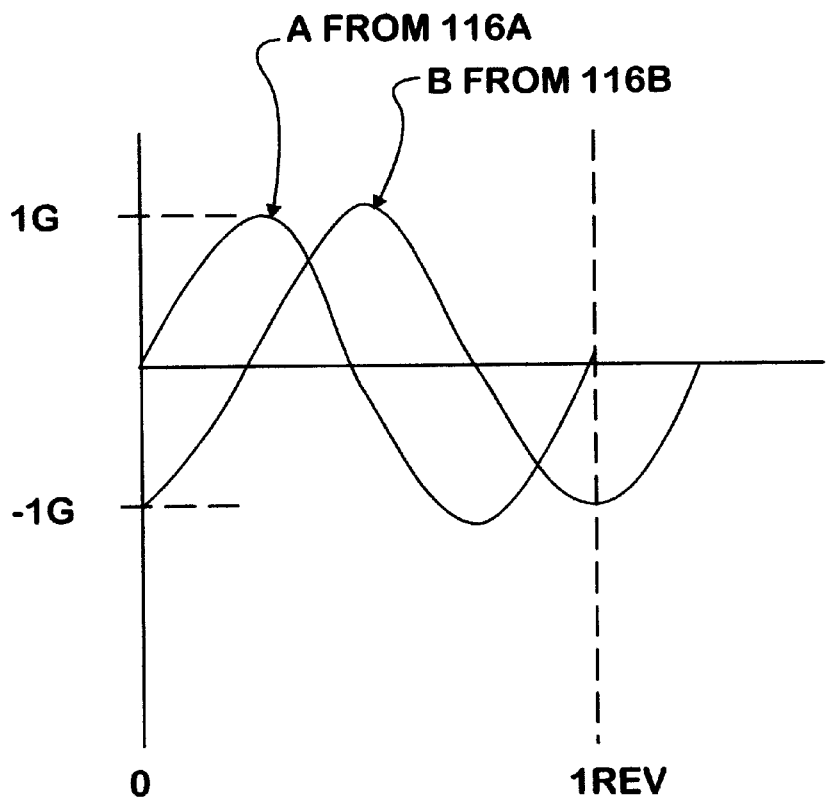
FIG. 3 depicts the output signal of the dual gravimetric rotation sensors of FIG. 2 throughout one revolution of a wheel of the vehicle of FIG. 1.

FIG. 3 depicts the output signal of the gravimetric rotation sensor 110 throughout one revolution of the wheel. As can be seen, the 90 degree mechanical relationship of the two independent gravitational accelerometers 116A and 116B results in a 90 degree phase relationship between the two outputs, labeled A and B. The relationship of these two waveforms is sometimes referred to as a quadrature waveform. Note that in this example the A-waveform is leading the B-waveform. If the wheel rotation is clockwise in this example, a similar waveform but with the B-waveform leading the A-waveform indicates the wheel is rotating in the counter clockwise direction. The number of rotations may be 'counted' by counting the number of cycles traversed by either of the two waveforms. The position within a revolution may be estimated by comparing the magnitude and polarity of each of the two phases.

Figure 4:
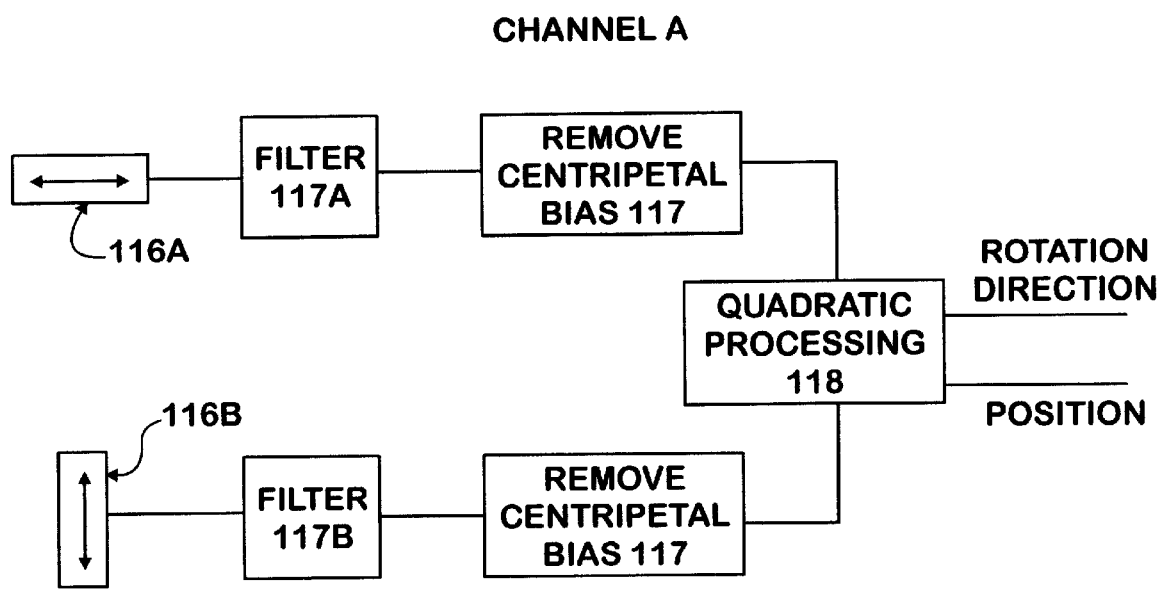
FIG. 4 depicts the initial steps of one embodiment of the process carried out within the 'Microprocessor and Signal Processing' block shown in FIGS. 1A and 1B.
Figure 5:
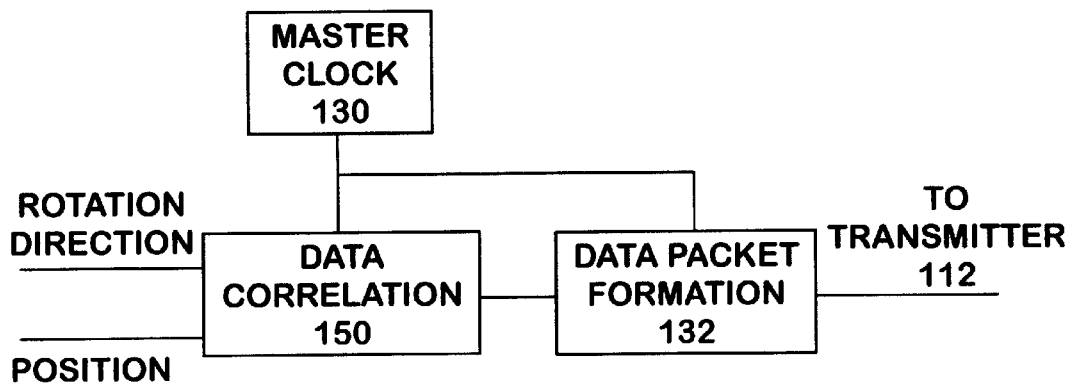
FIG. 5 depicts additional steps of the embodiment of the process shown in FIG. 4.

FIG. 4 and FIG. 5 taken together depict a level of detail within the 'Microprocessor and Signal Processing' block shown in FIGS. 1A and 1B. FIG. 4 depicts each of the two gravimetric accelerometers 116A and 116B, centripetal bias signal processing portions of the circuit 117, and the quadrature combining and tracking circuitry 118 for the two gravimetric signals A and B to yield the wheel rotation direction and position. There may also be a filter 117A before or after the centripetal bias circuit 117.

If an accelerometer 116A or 116B is mounted at a radius from the center of rotation of the wheel, then it will be subjected to a centripetal force and the positive (+) and negative (−) 1 G gravitational signal will be biased by this value. This bias will be proportional to the radius from the center and proportional to the square of the rotational rate of the wheel. This bias also serves as an auxiliary signal in this invention to characterize the speed. As will be shown below, the bias acceleration sensed is proportional to the square of the velocity of the wheels. Hence, the velocity is proportional to the square root of the sensed acceleration less gravity.

If the bias is so great that it saturates our gravitational sensor, then it serves as a diagnostic signal that can coach the installer to mount the sensor at a more centered location on the wheel. Also the filter 117A helps remove the 'noise' signals due to the road surface irregularities, so that the gravitational vector can be extracted. The quadrature-processing circuitry 118 compares the two signals in order to advance a state machine in software to estimate the wheel position and to count the number of wheel revolutions. FIG. 5 depicts further processing of the signals A and B emanating from the processing described in FIG. 4. The data signals are correlated in the data correlation circuit 150. The signals are sampled at a rate determined by a Master Clock 130 and must be sampled at a rate greater than the rotational rate of the wheel. The sample rate is at least 4 times the rate of rotation of the wheel for the preferred embodiment of the invention. This data along with the sample timestamp from the master clock 130 are prepared in data formation circuitry 132 into data packet suitable for transmission via the RF transmitter 112 depicted in FIGS. 1A and 1B. Wheel revolutions are counted and stored in a register of a microprocessor 131 in the navigation system 120.

Figure 6:
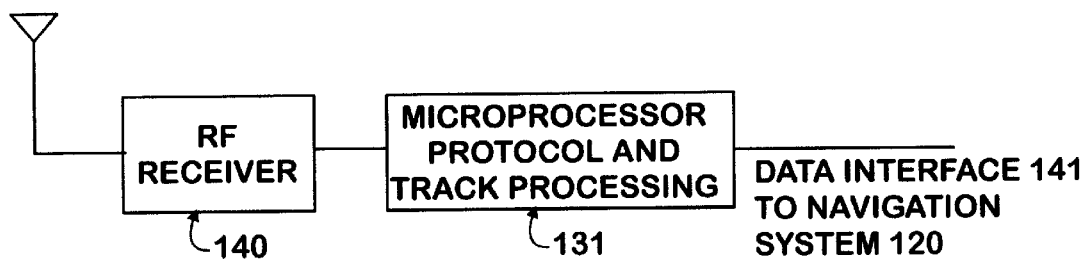
FIG. 6 depicts the RF receiver and microprocessor system of the vehicle of FIG. 1.
Figure 7:
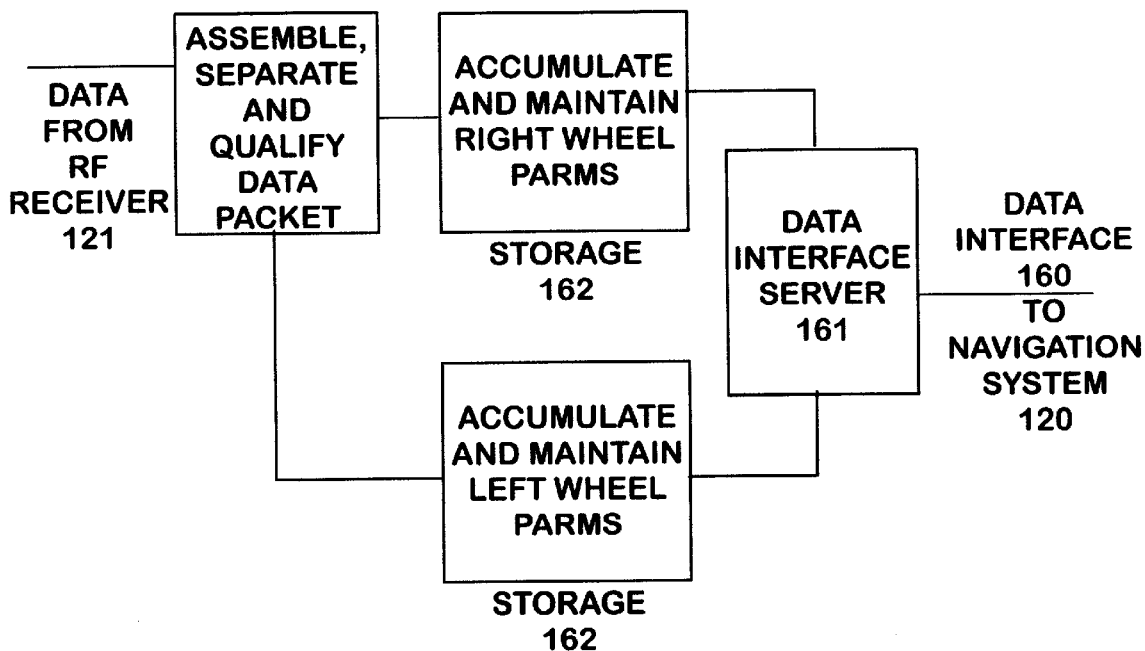
FIG. 7 is a block diagram of the microprocessor-based function in the receiver of FIG. 6.

FIG. 6 depicts the RF receiver 140 and microprocessor 131 system. Each of the two sensors 110 that are located on the wheels 104 and 105 as shown in FIG. 1 transmits signals containing the wheel position data. Signals from both these sources are received, error checked, disseminated, and made available to the navigation system 120 via the user data interface 141. FIG. 7 depicts the processing blocks of the microprocessor-131 based function in the receiver 140. First, the data from the RF receiver 140 is assembled and error checked packet by packet. It is passed on only if the data error-checking scheme verifies that the data is correct. The position registers for the right wheel 105 and for the left wheel 104 are updated and stored, along with a list of recent samples. The program can operate in either one of two modes: (1) where data is streamed out to a data interface 160 through an interface server 161, or (2) where the data is produced on a request from the navigation system via the data interface 160 through an interface server 161. Note that without having a wheel sensor 110 on each of the left front wheel 104 and right front wheel 105, changes in vehicle direction can not be determined. The navigation system 120 detects differences in wheel revolutions from the wheel sensors 110 between the left wheel 104 and the right wheel 105 hence providing a running fix of changes in the vehicle's 101 relative heading. If the vehicle 101 only has one wheel sensor 110 on one wheel it may only have distance traveled by that specific wheel information.

Figure 8:
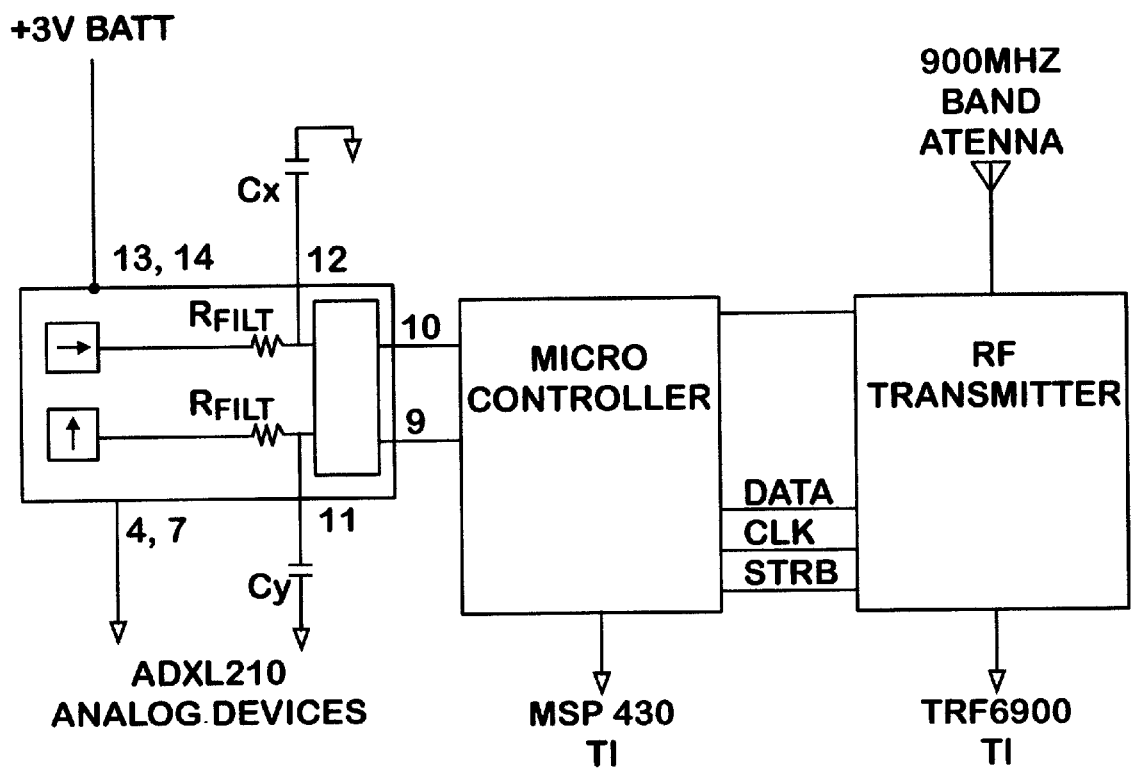
FIG. 8 is an example of a wheel sensor made of existing circuits in accordance with this invention.

It may be desirable to use existing integrated circuits, which are commercially available. FIG. 8 represents such an embodiment. Three commercially available circuits can be used to implement the wheel sensor module. An ADXL210, manufactured by Analog Devices Inc., contains 2 accelerometers which are orthogonal positioned with respect to each other, which meets our requirement to produce the quadrature 90 degree phase shifted outputs. Furthermore this circuit may, with the addition of the capacitors Cx and Cy perform the filtering function described in FIG. 4. The order of the location of the bias removal and the filtering function is interchangeable. The ADXL210 may provide the functions of the accelerometers 116A and 116B.

A micro-controller chip MSP430, manufactured by Texas Instruments Inc., takes in the two signals from the ADXL210 and using a digital averaging technique that has a low pass bandwidth cutoff well below the maximum rotational rate of the wheel. This will produce an average output which will be representative of the bias of the centripetal force experienced by the accelerometer sensors. If the sensor were positioned exactly at the center of rotation of the wheel, there would be no offset bias due to centripetal force. However our design anticipates that the sensor 110 will experience some offset from center. The ADXL210 has a range of measurement of +/− 10 G's. When the accelerometers 116A and 116B are offset from the center of the wheel, they experience forces due to the rotation of the wheel. The output A and B will reflect these forces. If the range of the accelerometers is too far from center and the accelerometers range of measurement is exceeded due the extra centripetal forces, the accelerometers will be saturated. An example of this is described below. The MSP430 may provide the function of the microprocessor 111.

A single chip RF transceiver TRF6900, also manufactured by Texas Instruments, may be electrically engaged to the MSP430 microchip controller for transmitting the sensor outputs to the receiver for storage and subsequent use by the vehicle navigation system 120. The TRF6900 may provide the function of the transmitter 112.

To demonstrate how to avoid saturation of the accelerometers, the following example is presented.
The fundamental mathematical relationship with which centripetal force is computed is:

$$A = -r\omega$$

where if the radius 'r' is in inches and rotational rate 'ω' is in radians per second
Then the centripetal acceleration 'a' will be in inches per second per second units
The above formula can be transformed to the parameters and units useful to our application as shown below:

$$g = 3.207 \times r \times \left[\frac{v}{D}\right]^2$$

where
r is the radius of the position of the accelerometer sensor
g is the centripetal acceleration force the accelerometer is subjected to in G's
v is the speed of the vehicle in MPH
D is the diameter of the vehicle wheel in inches
When using an accelerometer with a range of +/− 10 g, then the +/−1 g of headroom is required because as the wheel rotates it will experience the +/− 1 g from gravity. In the above formula, use V=60 MPH, and assume a wheel diameter D=24 inches, and elect to place the sensor at a radius from the center of the wheel of 0.125 inch. It is calculated that the sensor will experience about 2.5 g's of acceleration due to centripetal force. At 90 MPH, the same installation will experience about 5.6 g's, due to the centripetal force. This acceleration plus the 1 g gravity vector is within the range of the selected sensor. The centripetal bias portion circuit portions 117 may remove this centripetal bias sensed acceleration due to offset from the center of the wheel.

In order that one transmitter 112 not interfere with another either from the same or other vehicles 101, several spectrum allocation techniques may be employed. The simplest is to place each transmitter at a unique frequency of transmission. Another is to use a spread spectrum approach. Another is to use a spread time slot approach.

One approach may be to use the random time in slot approach. In this case, each transmitter 112 selects a pseudo random number seed based on its own ID address value. The next number thereafter determines the time at which it transmits in the sequence, and the receiver knows the sequence when it is programmed with the addresses of the transducers, which comprise its system. The receiver 140 must know which wheel sensors 110 or transducers it is responsible for. Placing the transducer into a special port of the receiver 140 and pressing the RF (right front) or LF (left front) button identifies these. In some cases, a vehicle 101 may have more than two sensor systems, and means for identifying these will be provided on such expanded capability systems.

Each accelerometer 116A or 116B measures the acceleration of gravity as it rotates. When the accelerometer is vertical it measures 1 g, and when rotated 180 degrees it measures −1 g. The 90 degree phase relationship between the two accelerometers permits not only measuring the angle during a revolution, but also permits determination of direction. If the accelerometer 116A or 116B is offset from the center, a centripetal or centrifugal force will be present. Depending on the orientation of the sensor an independent acceleration bias will be imposed on the signal we desire. This bias will be proportional to the square of the rotational velocity and directly proportional to distance from the center of rotation. This fixed bias will not disrupt the signal we make use of, but it does require an accelerometer of greater range so that the sin/cos signal we use is not buried in a saturation region of one of the accelerometers. The optimal placement for the sensing device is at the center of rotation.

Also, road surface irregularities will be recorded by the accelerometers. This information is noise for the purposes of this invention, and may be filtered out either in the transmitting sensor 110 or the receiver 140. In a more sophisticated filtering technique, a sliding frequency bandpass filter may be used to further reduce noise.

In the case where wheel was locked-up, such as in a severe braking maneuver, the vector sum of the outputs of accelerometers 116A or 116B may serve to produce a linear acceleration vector. This information may be useful either as the double integrated position information or to serve notice to the receiving system that the wheel rotational position information no longer represents accurate road position information due to slippage. This information will also be presented summed onto the quadrature waveform of interest in a manner similar to the centrifugal bias, however it will add and subtract throughout the revolution of the wheel sensor 110.

The following formula shows how the relative heading of the vehicle can be determined from the different distances traveled by the two tires.

If two successive samples are taken of the position of the left wheel and the right wheel $$\Delta\theta = \frac{(\Delta S_{Left1} - \Delta S_{Left2}) - (\Delta S_{Right1} - \Delta S_{Right2})}{B}$$

where $\Delta S_{Left1}$ is the first sample position of the left wheel $\Delta S_{Left2}$ is the second sample position of the left wheel $\Delta S_{Right1}$ is the first sample position of the right wheel $\Delta S_{Right2}$ is the second sample position of the right wheel B=distance from the track of the left wheel to the track of the right wheel all distance units must be in the same units, including B.

As described above, the rotational wheel sensor 110 of the present invention, and the vehicle 101 with at least one rotational wheel sensor 110 installed provide a number of advantages, some of which have been described above and others of which are inherent in the invention. Also modifications may be proposed to the rotational wheel sensor 110 and the vehicle 101 with a rotational wheel sensor 110 installed without departing from the teachings herein.

We claim:

1. A gravimetric rotational wheel sensor for use on a mobile vehicle, the mobile vehicle having a body, and front axle engaged to the body, and at least one wheel engaged to the axle, comprising:

a first accelerometer for engagement to the wheel;

a second accelerometer for engagement to the wheel and aligned relatively to sense gravitational force 90 degrees out of synch from said first accelerometer;

a transmitter for engagement to the wheel and for receiving electrical accelerometer output signals representing wheel rotation from said first and said second accelerometers and said transmitter for transmitting said accelerometer output signals;

said first accelerometer and said second accelerometer are within a container and said container may be mounted to the wheel;

a transmitter for allowing remote reporting of wheel position from said first and second accelerometers without the need for hard wiring;

a microprocessor-based electronic circuit for signal processing and data correlation; said container configured to ensure said first accelerometer and said second accelerometer are located near the center of the wheel when said container is engaged to the wheel; and said microprocessor-based electronic circuit for signal processing and data correlation has a generator that may convert sensed rotational motion of the wheels to electric power.

2. A gravimetric rotational wheel sensor for use on a mobile vehicle, the mobile vehicle having a body, and front axle engaged to the body, and at least one wheel engaged to the axle, comprising:

a first accelerometer for engagement to the wheel;

a second accelerometer for engagement to the wheel and aligned relatively to sense gravitational force 90 degrees out of synch from said first accelerometer;

a transmitter for engagement to the wheel and for receiving electrical accelerometer output signals representing wheel rotation from said first and said second accelerometers and said transmitter for transmitting said accelerometer output signals;

said first accelerometer and said second accelerometer are within a container and said container may be mounted to the wheel;

a transmitter for allowing remote reporting of wheel position from said first and second accelerometers without the need for hard wiring;

a microprocessor-based electronic circuit for signal processing and data correlation;

said container configured to ensure said first accelerometer and said second accelerometer are located near the center of the wheel when said container is engaged to the wheel;

said first and second accelerometer provide two output wave results in a quadrature waveform in a 90 degree phase relationship between said two outputs when installed on a wheel and the wheel rotates; and said microprocessor-based electronic circuit for signal processing and data correlation has a centripetal bias signal processing circuit portion programmed for accounting for offset from center of the wheel upon mounting.

3. The wheel sensor of claim 2, wherein:

said centripetal bias signal processing circuit portion determines bias due to offset by use of formula:

$$g = 3.207 \times r \times \left[\frac{v}{D}\right]^2$$

where
r is the radius of the position of the accelerometer sensor;
g is the centripetal acceleration force the accelerometer is subjected to in G's;
v is the speed of the vehicle in MPH; and
D is the diameter of the vehicle wheel in inches.

4. The wheel sensor of claim 2, wherein:

said quadrature waveform is output of a quadrature combining and tracking circuitry of said microprocessor-based electronic circuit for signal processing and data correlation for combining said first and second accelerator output signals to yield the wheel rotation direction and position.

5. The wheel sensor of claim 4, additionally comprising:
a filter in series with said centripetal bias circuit portion.

6. The wheel sensor of claim 5, additionally comprising:
a data correlation circuit electrically engaged to said quadrature combining and tracking circuitry for correlating said combined first and second accelerator output signals;
a master clock engaged to said data correlation circuit and for sampling said first and second accelerator output signals at a rate greater than sensed rotational rate of the wheel; and
data packet formation circuitry engaged to said data correlation circuit and said transmitter.

7. The wheel sensor of claim 6, wherein:
said master clock samples data at greater than or equal to four times the rate of rotation of the wheel.

8. A mobile vehicle, comprising:
a body;
front axle engaged to said body;
said front axle engaged to a left front steerable wheel and a right front steerable wheel, each of said wheels having an inner hub for mounting to said front axle;

a navigation system within said body;

a first gravimetric rotational wheel sensor engaged to a first of said front wheels, comprising:
a first accelerometer;
a second accelerometer aligned relatively to sense gravitational force 90 degrees out of synch from said first accelerometer; and
a transmitter for receiving electrical accelerometer output signals representing wheel rotation from said first and said second accelerometers and said transmitter for transmitting said accelerometer output signals;

a receiver and microprocessor system for receiving and error checking said electrical accelerometer output signals from said first front wheel transmitter;

said receiver engaged to said navigation system to provide said electrical accelerometer output signals to said navigation system providing said navigation system an indication of distance traveled and direction of first front wheel rotation;

a second gravimetric rotational wheel sensor engaged to a second of said front wheels, comprising:
a third accelerometer;
a fourth accelerometer aligned relatively to sense gravitational force 90 degrees
out of synch from said third accelerometer; and a second transmitter for receiving electrical accelerometer output signals representing wheel rotation from said third and said fourth accelerometers and said second transmitter for transmitting said accelerometer output signals to said receiver; and said receiver, microprocessor, and navigation system programmed to process output signals from said first and second rotational wheel sensors to determine distance traveled and changes in vehicle direction due to sensed relative wheel rotation.

9. The vehicle of claim 8, wherein:
said receiver, microprocessor, and navigation system detects changes in vehicle direction by use of formula:

$$\Delta\theta = \frac{(\Delta S_{Left1} - \Delta S_{Left2}) - (\Delta S_{Right1} - \Delta S_{Right2})}{B}$$

where
$\Delta S_{Left1}$ is the first sample position of said left wheel
$\Delta S_{Left2}$ is the second sample position of said left wheel
$\Delta S_{Right1}$ is the first sample position of said right wheel
$\Delta S_{Right2}$ is the second sample position of said right wheel
B=distance from the track of said left wheel to the track of said right wheel all distance units must be in the same units, including B.

10. The vehicle of claim 9, wherein:
said first accelerometer and said second accelerometer are within a container, said third accelerometer and said fourth accelerometer are within a container, and said containers each have mounting means for mounting to said respective wheels;
said mounting means configured to ensure said accelerometers are located near the center of said respective wheels.

11. The vehicle of claim 10, wherein:
said transmitters are programmed to not interfere with other transmitters and allow differentiation by said receiver by use of a spectrum allocation technique.

12. The vehicle of claim 11, wherein:

said spectrum allocation technique is that each said transmitter is at a unique frequency of transmission.

13. The vehicle of claim 11, wherein:

said spectrum allocation technique is a spread time slot approach.

14. The vehicle of claim 13, wherein:

said spectrum allocation technique is a spread spectrum approach.

15. A gravimetric rotational wheel sensor for use on a mobile vehicle, the mobile vehicle having a body, and front axle engaged to the body, and at least one wheel engaged to the axle, comprising:

an accelerometer for engagement to the wheel; and a transmitter for engagement to the wheel and for receiving electrical accelerometer output signals representing both static and dynamic wheel position and rotation from said accelerometer and said transmitter for transmitting said accelerometer output signal.

16. The wheel sensor of claim 3, wherein:

said centripetal bias signal processing circuit portion uses bias as a measurement of rate rotation of the wheel.

17. A gravimetric rotational wheel sensor for use on a mobile vehicle, the mobile vehicle having a body, and front axle engaged to the body, and at least one wheel engaged to the axle, comprising:

a first accelerometer for engagement to the wheel;

a second accelerometer for engagement to the wheel and aligned relatively to sense gravitational force 90 degrees out of synch from said first accelerometer; and a transmitter for engagement to the wheel and for receiving electrical accelerometer output signals representing wheel radial position in both static and dynamic conditions and amount of rotation upon rotation from said first and said second accelerometers and said transmitter for transmitting said accelerometer output signals.

18. The wheel sensor of claim 17, additionally comprising:

a transmitter for allowing remote reporting of wheel position from said first and second accelerometers without the need for hard wiring.

19. The wheel sensor of claim 18, additionally comprising:

an electronic circuit for signal processing and data correlation.

20. The wheel sensor of claim 19, wherein:

said first and second accelerometer provide two output wave results in a quadrature waveform in a 90 degree phase relationship between said two outputs when installed on a wheel and the wheel rotates.

21. The wheel sensor of claim 20, wherein:

said electronic circuit for signal processing and data correlation having a centripetal bias signal processing circuit portion programmed for accounting for offset from center of the wheel upon mounting.

* * * * *